W. J. McDermott,
Hay Press.
No. 95,249.
Patented Sep. 28, 1869.
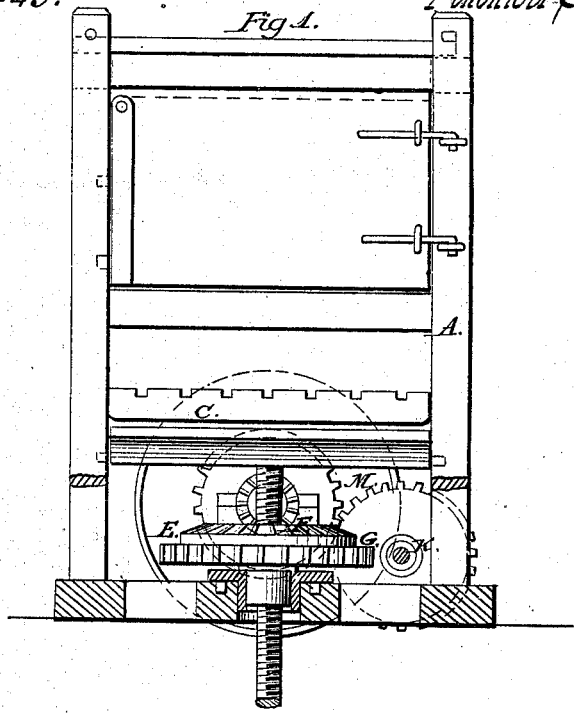
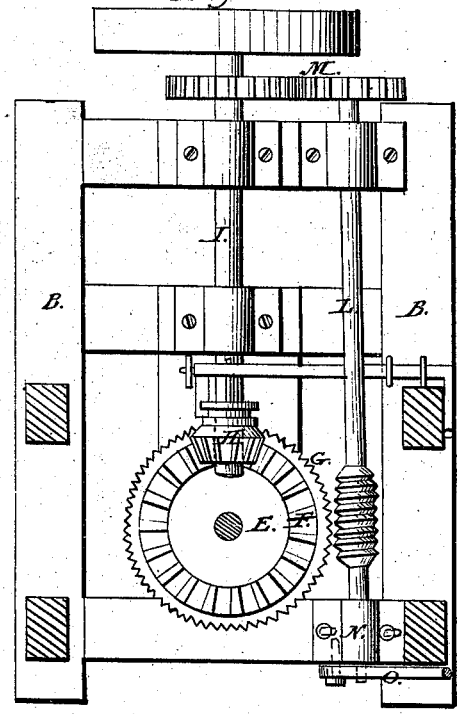
Witnesses:
M. Wrlander
Geo. W. Mabee
Inventor:
W. J. McDermott
by Munn & Co.
Attorneys

United States Patent Office.

W. J. McDERMOTT, OF COVINGTON, TENNESSEE.

Letters Patent No. 95,249, dated September 28, 1869.

IMPROVEMENT IN PRESSES.

The Schedule referred to in these Letters Patent and making part of the same.

*To all whom it may concern:*

Be it known that I, W. J. McDermott, of Covington, in the county of Tipton, and State of Tennessee, have invented a new and useful Improvement in Presses; and I do hereby declare that the following is a full, clear, and exact description thereof, which will enable others skilled in the art to make and use the same, reference being had to the accompanying drawings, forming part of this specification.

This invention relates to improvements in presses for hay, cotton, and the like, and has for its object to provide a simple and convenient arrangement for changing the application of the power when the resistance increases, to give a greater force, the speed being decreased.

Figure 1 represents an elevation of my improved press, partly in section, and

Figure 2 represents a horizontal section of the same.

Similar letters of reference indicate corresponding parts.

The frame A is erected in a vertical position upon the bed B, which is extended at one side beyond the vertical part.

The follower C moves up from below, in pressing, and is actuated by a screw, D, which is screwed up and down by a screwed hub in a wheel, E. This wheel is provided with two sets of cog-teeth, F and G. The former gear with a pinion, H, on the driving-shaft I, and arranged to slide thereon for gearing and ungearing with the wheel E. The latter teeth gear with a worm, K, on a shaft, L, parallel with the shaft I, and gearing with it by a pair of toothed wheels, M, so as to be operated by the same prime power.

The shaft L, at the end provided with the worm K, is placed in a sliding bearing, N, and provided with a hand-lever, O, for moving it. The wheel H is also provided with a hand-lever, for sliding it.

Power being applied to the belt-wheel on the shaft I, for first moving the follower, the wheel H, which gives the fast motion to the screw, is geared with the wheel E, until by compression the resistance increases too much for the said fast motion, then the worm-gear is connected with the wheel E, and the wheel H thrown out. This so changes the leverage in favor of the power as to permit the finishing of the movement of the follower without undue strain, although at a slower motion.

For returning the follower, the wheel H is employed, the worm being thrown out.

Having thus described my invention,

I claim as new, and desire to secure by Letters Patent—

The combination, with the screw and follower, of the wheel E, having a screwed hub and two sets of teeth, F G, the wheels H K and their shafts, all arranged substantially as specified.

W. J. McDERMOTT.

Witnesses:
   E. McDaniel,
   H. T. Ziegler.